United States Patent
Im et al.

(10) Patent No.: US 8,367,254 B2
(45) Date of Patent: *Feb. 5, 2013

(54) ELECTROLYTE FOR A HIGH VOLTAGE BATTERY AND LITHIUM SECONDARY BATTERY COMPRISING THE SAME

(75) Inventors: Keun Yung Im, Seongnam-si (KR); Ki Young Lee, Daejeon (KR); Joon Sung Bae, Daejeon (KR); Young Tack An, Daejeon (KR)

(73) Assignee: LG Chem, Ltd., Seoul (KR)

( * ) Notice: Subject to any disclaimer, the term of this patent is extended or adjusted under 35 U.S.C. 154(b) by 104 days.

This patent is subject to a terminal disclaimer.

(21) Appl. No.: 12/857,051

(22) Filed: Aug. 16, 2010

(65) Prior Publication Data

US 2011/0165474 A1    Jul. 7, 2011

Related U.S. Application Data

(63) Continuation-in-part of application No. 10/935,027, filed on Sep. 7, 2004, now Pat. No. 8,158,285.

(30) Foreign Application Priority Data

Sep. 5, 2003  (KR) .................. 10-2003-0062206

(51) Int. Cl.
  *H01M 6/16* (2006.01)
(52) U.S. Cl. ......... 429/336; 429/324; 429/326; 429/329
(58) Field of Classification Search .................. None
  See application file for complete search history.

(56) References Cited

U.S. PATENT DOCUMENTS

| | | | |
|---|---|---|---|
| 5,529,859 A | 6/1996 | Shu et al. | |
| 6,210,835 B1 | 4/2001 | Arai | |
| 6,406,816 B2 | 6/2002 | Hikmet | |
| 6,506,524 B1 | 1/2003 | McMillan et al. | |

FOREIGN PATENT DOCUMENTS

| | | |
|---|---|---|
| EP | 1463143 A2 | 9/2004 |
| EP | 1463143 A3 | 4/2008 |
| JP | 08-115742 | 5/1996 |
| JP | 10-199567 | 7/1998 |
| JP | 11-242964 | 9/1999 |
| WO | 2004-093679 | 11/2004 |

OTHER PUBLICATIONS

"Fluoroethylene Carbonate Electrolyte and Its Use in Lithium Ion Batteries With Graphite Anodes"; Authors: Rod McMillan, et al.; Journal of Power Sources, pp. 20-26 (1999).
"STM Study on Graphite/Electrolyte Interface in Lithium-Ion Batteries: Solid Electrolyte Interface Formation in Trifluoropropylene Carbonate Solution"; Authors: Minoru Inaba, et al.; Electrochimica Acta 45, pp. 99-105 (1999).
PCT International Search Report for Application No. PCT/KR2004/002252; Mailing date: Jan. 14, 2005.
Korean Office Action dated Feb. 14, 2006.
Supplementary EP Search Rept dtd Aug. 28, 2009 for PCT/KR2004002252.

*Primary Examiner* — Cynthia Lee
(74) *Attorney, Agent, or Firm* — Birch, Stewart, Kolasch & Birch, LLP

(57) ABSTRACT

The present invention provides an electrolyte for lithium secondary batteries that allows the batteries to operate safely at a charging voltage up to 4.35V, wherein the electrolyte comprises a combination of a fluoroethylene carbonate compound and a linear ester compound as solvent. Also, the present invention provides a lithium secondary battery that can operate at a charging voltage up to 4.35V, which comprises a positive electrode, a negative electrode and an electrolyte, wherein the electrolyte comprises fluoroethylene carbonate compound and linear ester compound as solvent.

13 Claims, 3 Drawing Sheets

ELECTROLYTE FOR A HIGH VOLTAGE BATTERY AND LITHIUM SECONDARY BATTERY COMPRISING THE SAME

CROSS REFERENCE TO RELATED APPLICATION

This application is a continuation-in-part of U.S. patent application Ser. No. 10/935,027, filed Sep. 7, 2004, which claims priority to Korean Patent Application No. 10-2003-0062206, filed on Sep. 5, 2003, and all the benefits accruing therefrom under 35 U.S.C. §119, the disclosure of which is incorporated by reference herein in its entirety.

BACKGROUND OF THE INVENTION

1. Technical Field

The present invention relates to an electrolyte, which has improved safety and stability, for use in high voltage batteries, and to a lithium secondary battery comprising the electrolyte. Particularly, the present invention relates to an electrolyte that can operate safely when charged at a charging voltage of up to 4.35V or higher, and to a lithium secondary battery comprising the electrolyte.

2. Background Art

As the use of portable devices, such as high-performance notebook computers and mobile phones becomes increasingly popular all over the world, the demand for high-performance secondary batteries with high energy density is increasing exponentially. Particularly, lithium ion secondary batteries are being increasingly applied in most portable electronic products despite their relatively recent introduction to the market, and thus, studies to extend the run-time of portable devices by increasing the capacity of lithium secondary batteries are being actively conducted. In addition, for portable electronic products using display devices such as liquid crystal displays ("LCDs"), a more powerful lithium ion battery is both increasingly necessary and desirable for more efficient performance of such devices. However, since increases in the battery capacity and in the operating voltage of batteries can lead to deterioration in the battery safety, various attempts to improve the safety of lithium secondary batteries have been made.

Putting together the results of studies conducted up to now on the safety of the lithium secondary batteries, the thermal stability of active material and electrolyte in a charged state has the greatest effect on the battery safety. For this reason, studies to improve the safety of the lithium secondary batteries consist mainly of attempts to develop positive active materials with excellent thermal stability and studies to improve the thermal stability of electrolytes.

At present, the solvents used in electrolytes for the lithium secondary batteries are mainly cyclic and linear carbonates. Such solvents are inflammable and thus, upon either an increase in temperature as caused by local short circuits within the batteries, or an increase in surrounding temperature, the solvents will easily react with oxygen generated by the structural degradation of an active material in the battery, particularly a positive active material, resulting in combustion and explosion. For this reason, imparting flame retardance to the electrolytes will greatly contribute to the improvement of the battery safety.

Many studies on flame retardant electrolytes which can be used in the lithium secondary batteries have been conducted, centering on either solvents containing a compound having a fluorine-for-hydrogen substitution in carbonate or solvents containing phosphorus. Such a solvent has lower flammability and combustibility than those of the prior carbonate or ester solvents, but needs to be used in large amounts in order that the electrolyte has sufficient flame retardance. Also, such flame retardant solvents show a lower solubility toward lithium salts than the existing cyclic carbonates and contain fluorine or phosphorus having a higher atomic weight than that of hydrogen in the unsubstituted cyclic carbonates, resulting in a great increase in the viscosity of electrolytes. Thus, if the volume ratio of this flame retardant solvent in electrolyte solvent increases, the performance of batteries will greatly deteriorate due to a reduction in lithium ion conductivity.

Japanese Patent Laid-open Publication No. Hei 10-199567 discloses that if trifluoropropylene carbonate (i.e., trifluoromethyl-substituted ethylene carbonate, "TFPC") of the following formula 1 is used at the amount of 60-90% by volume relative to the total volume of electrolyte solvent, the safety of batteries can be improved:

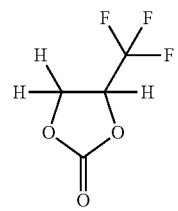

[Formula 1]

However, trifluoropropylene carbonate has about two times higher viscosity than that of ethylene carbonate or propylene carbonate, each a generally used solvent. Thus, if trifluoropropylene carbonate is used at the amount described in the Japanese publication, it will result in a significant reduction in the ion conductivity of the electrolyte formed therewith, thus making the deterioration of battery performance inevitable. Moreover, as the trifluoropropylene carbonate is a propylene carbonate substituted with fluorine, it has some of the general disadvantages of propylene carbonate. In particular, if it is used in an electrolyte solvent, the stability of any coating layer formed at the interface between a graphite negative electrode and an electrolyte will be adversely affected and therefore insufficient to a degree, and problems in the charge/discharge life cycles of the battery will occur, as described in *Electrochimica Acta* Vol. 45, p. 99, (1999).

U.S. Pat. No. 6,506,524 describes a solvent consisting of fluoroethylene carbonate and propylene carbonate used as electrolyte solvent and the resulting electrolyte-stable protective layer capable of being formed on the surface of a graphite negative electrode material. However, if the solvent of this composition is used as electrolyte solvent, the ion conductivity of electrolyte will be reduced to less than 7 mS/cm, thus deteriorating the performance of batteries, because fluoroethylene carbonate and propylene carbonate have high dielectric constant but undesirably high viscosity.

When the ion conductivity of electrolyte is reduced to less than 7 mS/cm, the conducting properties of the ions in the electrolyte deteriorate and the movement of the lithium ions becomes slow, resulting in an overall deterioration of the battery performance.

BRIEF SUMMARY OF THE INVENTION

The present inventors have found that if fluoroethylene carbonate compound in combination with linear ester compound is used as an electrolyte solvent for batteries, the safety of the batteries will be improved while the performance of the batteries will not be deteriorated, unlike the prior art. In addition, the electrolyte using the above electrolyte solvent has improved stability and safety, and thus a lithium secondary battery formed from the electrolyte can safely and stably be used at a high voltage state of up to 4.35V or higher, without a rapid exothermic reaction resulting in substantial decomposition of the electrolyte.

Accordingly, it is an object of the present invention to provide an electrolyte for high voltage batteries, which comprises a combination of a fluoroethylene carbonate compound and a linear ester compound as electrolyte solvent, as well as a high voltage lithium secondary battery comprising the electrolyte.

In the present invention, a high voltage secondary battery means a battery having an operating charging voltage that is higher than conventional charging voltage of 4.2V.

In one aspect, the present invention provides an electrolyte for a lithium secondary battery having full-charge voltage of up to 4.35V, comprising a combination of a fluoroethylene carbonate compound and a linear ester compound as an electrolyte solvent. Specifically, the present invention provides an electrolyte for a lithium battery comprising electrolyte solvent and a lithium salt, wherein the electrolyte solvent comprises a combination of a fluoroethylene carbonate compound and a linear ester compound, and wherein the lithium secondary battery formed from the electrolyte operates when charged at a charging voltage up to 4.35V. As used herein, the term "operate" means subjecting the battery either to storage, or to one or more charge/discharge cycles during exposure to temperatures of up to 200° C., specifically up to 150° C., under ambient atmospheric humidity conditions. Specifically, in an embodiment, the battery can be operated by charging at a voltage of up to 4.35V and subsequently subjecting the battery to temperature conditions of up to 150° C. In another embodiment, the battery can be operated by charging at a voltage of up to 4.2V and subsequently subjecting the battery to temperature conditions of up to 150° C.

In another aspect, the present invention provides a lithium secondary battery comprising a positive electrode, a negative electrode and an electrolyte, wherein the electrolyte comprises an electrolyte solvent and a lithium salt in which the electrolyte solvent comprises a fluoroethylene carbonate compound and a linear ester compound, and wherein the lithium secondary battery can operate safely when charged at a charging voltage of up to 4.35V. In a specific embodiment, the lithium battery operates safely where no rapid exothermic reaction of the electrolyte occurs during charging of a battery comprising the electrolyte.

DETAILED DESCRIPTION OF THE INVENTION

Figure 1:
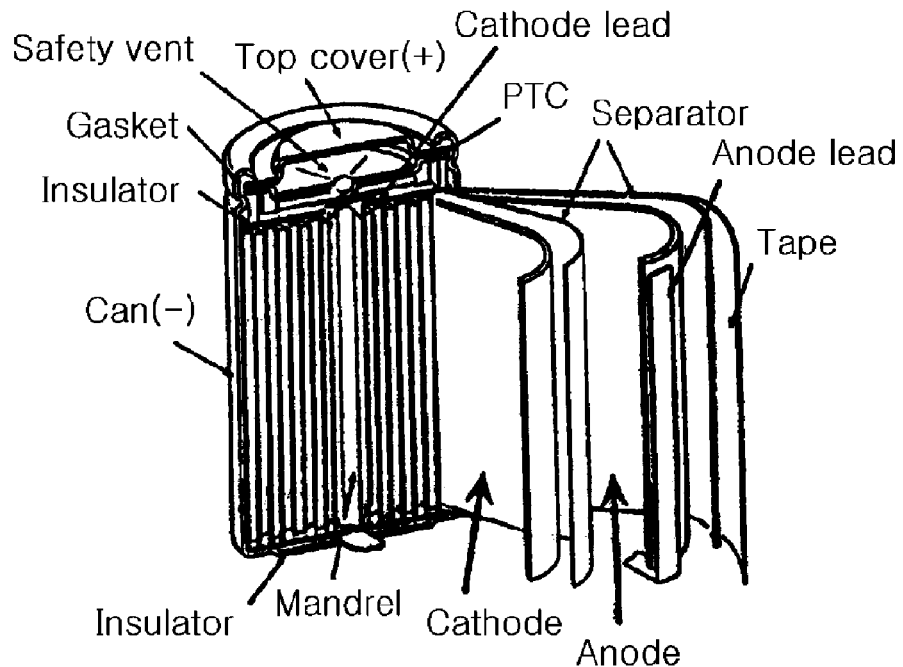
FIG. 1 illustrates the general structure of a cylindrical battery.
Figure 2:
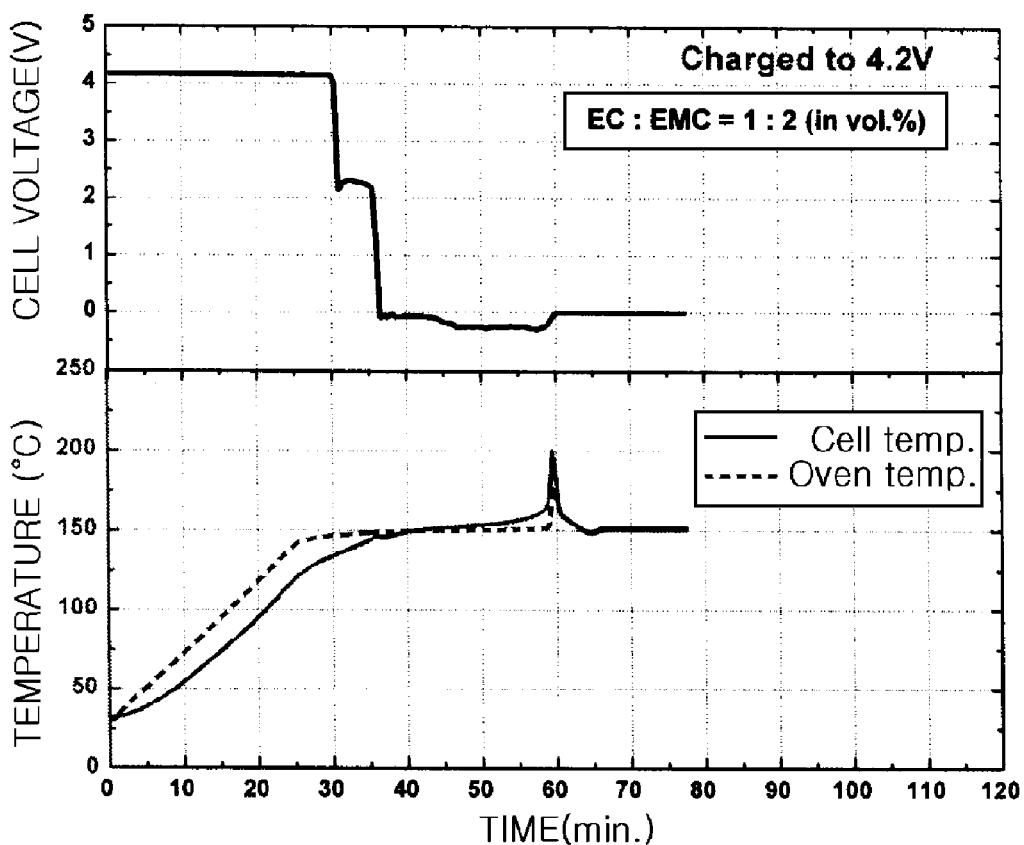
FIGS. 2 and 3 are graphic diagrams showing the results of hot-box tests in a charged state of 4.2 V on batteries fabricated by using the electrolytes prepared in Comparative Example 1 and in Example 2, respectively.

Hereinafter, the present invention will be described in detail.

The present invention provides an electrolyte for lithium secondary batteries, which comprises a combination of a fluoroethylene carbonate compound and a linear ester compound as an electrolyte solvent, in which the electrolyte enables the lithium batteries to operate safely when charged at a charging voltage of up to 4.35V.

Fluoroethylene carbonate which can be used in the present invention is selected from the group consisting of monofluoroethylene carbonate ("F1EC") represented by the following formula 2, difluoroethylene carbonate (trans- or cis-di-FEC; also abbreviated generally as "F2EC") represented by the following formula 3 or 4, and a mixture thereof:

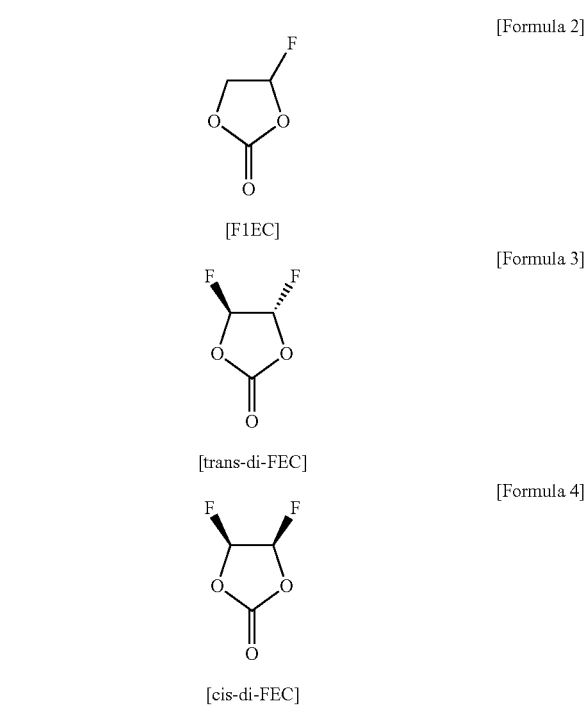

[Formula 2]
[F1EC]

[Formula 3]
[trans-di-FEC]

[Formula 4]
[cis-di-FEC]

Upon the initial charge of a battery comprising the above electrolyte solvent, the fluoroethylene carbonate compound forms a coating layer with high thermal stability on a negative electrode, and upon the exposure of the battery to high temperature, it further forms the coating layer on the surface of an electrode active material, so that it inhibits any rapid exothermic reaction, thus greatly improving the battery safety. Particularly, it forms a more stable coating layer on a negative electrode when compared to a non-fluorinated carbonate compound. For this reason, in lithium secondary batteries, the fluoroethylene carbonate prevents lithium loss caused by a reaction between lithium and electrolyte, and prevents the decomposition of the electrolyte since it shows oxidative decomposition only at high voltage. This results in an improvement in storage characteristics of the batteries.

Furthermore, unlike trifluoropropylene carbonate or other highly fluorinated carbonate solvents which contain at least three fluorine atoms as described in Japanese Patent Laid-open Publication No. Hei 10-199567, the fluoroethylene carbonate compounds disclosed herein contain only one or two fluorine atoms. Thus, use of the fluoroethylene carbonate compounds can prevent the problem of an excessive increase in viscosity, which occurs in the case of the use of the compound containing three or more of fluorine atoms, thus preventing deterioration in the battery performance. In addition, as known in the art, if the trifluoropropylene carbonate as described in the aforementioned Japanese Patent Publication is used, the stability of any coating layer formed by the trifluoropropylene carbonate will be insufficient and problems in the charge/discharge life cycles of batteries prepared using the trifluoropropylene carbonate will arise, due to the shortcomings of the trifluoropropylene carbonate itself. The fluoroethylene carbonate of the present invention does not cause such problems, however.

By using a linear ester compound together with the fluoroethylene carbonate, not only can the present invention improve the battery safety but deterioration in the battery performance can also be prevented, unlike that of batteries prepared using electrolyte solvents of the prior art. Concrete descriptions are as follows.

Table 1 below shows the physical properties of fluoroethylene carbonate (F1EC, F2EC), trifluoropropylene carbonate (TFPC), ethylene carbonate ("EC"), propylene carbonate ("PC"), dimethyl carbonate ("DMC"), ethyl methyl carbonate ("EMC"), diethyl carbonate ("DEC"), ethyl acetate ("EA") and methyl propionate ("MP"), which are known as electrolyte solvents in the prior art.

TABLE 1

Physical properties of electrolyte solvents

| Solvent | Viscosity (ambient temperature) (cP) | Dielectric constant | Molecular weight (g/mol) |
| --- | --- | --- | --- |
| F1EC | 4.1 | 78.4 | 106.1 |
| trans-F2EC | 2.5 | 37.1 | 124.0 |
| TFPC | 5.0 | 62.0 | 156.0 |
| EC | 2.5 | 89 | 88.1 |
| PC | 2.53 | 65 | 102.1 |
| DMC | 0.59 | 3.1 | 90.1 |
| EMC | 0.65 | 3.0 | 104.1 |
| DEC | 0.75 | 2.8 | 118.1 |
| EA | 0.44 | 6.0 | 88.11 |
| MP | 0.43 | 6.2 | 88.11 |

As shown in Table 1, fluoroethylene carbonate (F1EC or F2EC) has a very high viscosity at ambient temperature (as reported in centipoise, abbreviated cP). Thus, if it is used alone, it will result in deterioration in the battery performance.

Furthermore, cyclic carbonates (EC and PC) have a higher viscosity than that of linear carbonates (DMC, EMC, DEC, EA and MP). Thus, even when a fluoroethylene carbonate compound is used in combination with the cyclic carbonate compound as an electrolyte solvent, the combination will lead to deterioration in the battery performance due to higher viscosity. For example, U.S. Pat. No. 6,506,524 discloses the use of fluoroethylene carbonate in combination with cyclic propylene carbonate, in which case the battery performance will be deteriorated due to a reduction in ion conductivity.

Trifluoropropylene carbonate (TFPC) disclosed in Japanese Patent Laid-open Publication No. Hei 10-199567 has a much higher viscosity than that of fluoroethylene carbonate compound (F1EC or F2EC). Thus, even if trifluoropropylene carbonate (TFPC) is used in combination with a linear carbonate solvent, it will be difficult to prevent deterioration in the battery performance.

Accordingly, in the present invention, a mixture containing a combination of both a fluoroethylene carbonate compound and a linear ester compound is used as an electrolyte solvent for batteries. This combination has unexpectedly been found to improve the battery safety without deteriorating the battery performance.

Other solvents having other halogens are problematic. For example, Japanese Patent Laid-open Publication No. Hei 8-115742 shows the use of chloroethylene carbonate and a linear carbonate as electrolyte solvent. However, as described in *Journal of Power Sources*, vol. 81/82, p. 20 (1999), where chloroethylene carbonate (ClEC) is used in combination with a linear carbonate as an electrolyte solvent, lithium chloride (LiCl) is formed by the reductive decomposition of chloroethylene carbonate (ClEC) on a negative electrode. The formed lithium chloride (LiCl) moves to a positive electrode to form chlorine ($Cl_2$) which, in turn, moves to the negative electrode to a chloride anion ($Cl^-$). Since this reaction is repeated, the use of chloroethylene carbonate in combination with linear carbonate as electrolyte solvent adversely affects the battery performance.

On the other hand, lithium fluoride (LiF) formed by the reaction of fluoroethylene carbonate (F1EC), one component of the electrolyte solvent according to the present invention, has a lower solubility than that of lithium chloride, which indicates a reduction in the repeated reactions as described above. Thus, the electrolyte solvent according to the present invention shows a reduced amount, or very little deterioration of the battery performance as compared to the case where chloroethylene carbonate is used in combination with a linear carbonate as the electrolyte solvent.

In short, in the present invention, fluoroethylene carbonate compound in combination with linear ester compound is used as electrolyte solvent unlike the above-mentioned US patent and Japanese Patent Publication, thus improving the battery safety without deteriorating the battery performance.

The linear ester compounds which can be used in the present invention include ester (R—C(O)O—R') compounds, carbonate (R—OC(O)O—R') compounds, or a mixture, where R and R' are each independently alkyl groups. Concrete examples thereof include, but are not limited to, ethyl methyl carbonate, dimethyl carbonate, diethyl carbonate, ethyl acetate, methyl propionate, and a mixture of two or more thereof.

The electrolyte of the present invention comprises an electrolyte solvent and a lithium salt, and according to one exemplary embodiment of the present invention the electrolyte solvent contains a fluoroethylene carbonate compound at the amount of 20-60% by volume, based on the total volume of the electrolyte solvent. In the exemplary embodiment, in order to provide sufficient safety and storage characteristics to the batteries, the fluoroethylene carbonate compound is contained at the amount of 20% by volume or more, and in order not to cause unnecessary adverse effect to the battery performance, it is contained at the amount of 60% by volume or less. Meanwhile, according to one exemplary embodiment of the present invention the linear ester compound is contained at the amount of 40-80% by volume, based on the total volume of the electrolyte solvent.

In another aspect, the present invention provides a lithium secondary battery comprising a positive electrode, a negative electrode and an electrolyte, wherein the electrolyte comprises an electrolyte solvent and a lithium salt, in which the electrolyte solvent comprises a combination of a fluoroethylene carbonate compound and a linear ester compound.

The lithium secondary battery according to the present invention is a high voltage battery that can operate safely and stably even at a voltage over the lithium secondary battery's conventional charging voltage of 4.2V. According to one aspect of the present invention, the lithium secondary battery of the present invention can operate at a charging voltage up to 4.35V with guaranteed safety and stability. Thus, the present invention can provide a lithium secondary battery having various safe-operating charging voltages of even higher than 4.2V to 4.35V as well as conventional 4.2V.

The inventive lithium secondary battery can be fabricated using materials and methods known in the art except that the inventive electrolyte solvent disclosed herein is used to prepare the electrolyte. For example, the inventive lithium secondary battery can be fabricated by interposing a porous separator between a positive electrode and a negative electrode by a conventional method so as to produce an electrode structure, placing the electrode structure into a battery case, and injecting the inventive non-aqueous electrolyte into the resulting battery case.

Examples of lithium salts which can be used in the present invention include, but are not limited to, lithium hexafluorophosphate ($LiPF_6$), lithium tetrafluoroborate ($LiBF_4$), lithium bis(trifluoromethanesulfonyl)imide ($LiN(CF_3SO_2)_2$), lithium bis(perfluoroethylsulfonyl)imide ($LiN(C_2F_5SO_2)_2$), lithium tris(trifluoromethanesulfonyl)methide ($LiC(CF_3SO_2)_3$), lithium triflate ($LiCF_3SO_3$), lithium bisoxalatoborate ($LiC_4BO_8$) or a mixture of two or more thereof.

The inventive electrolyte preferably has an ion conductivity of 7 mS/cm or more, more preferably 7.5 mS/cm or more, and still more preferably 8 mS/cm or more, at ambient temperature. At an ion conductivity of less than 7 mS/cm, the movement of ions in the electrolyte will be slow, thus deteriorating the battery performance.

In the present invention, active materials for the positive electrode include lithium-transition metal composite oxides. Non-limited examples thereof include $LiCoO_2$, $LiNiO_2$, $LiMn_2O_4$, $LiMnO_2$, and $LiNi_{1-x}CO_xM_yO_2$ (M=Al, Ti, Mg or Zr, $0<X\leq1$, $0\leq Y\leq0.2$), $LiNi_xCO_YMn_{1-x-y}O_2$ ($0<X\leq0.5$, $0<Y\leq0.5$), $LiM_xM'_yMn_{(2-x-y)}O_4$ (M, M'=V, Cr, Fe, Co, Ni or Cu, $0<X\leq1$, $0<Y\leq1$), $LiCoPO_4$, and the like.

In the present invention, materials for the negative electrode include materials capable of absorbing, storing and releasing lithium, non-limiting examples of which include carbon, silicon and tin compounds, which can absorb, store and release lithium.

By using the electrolyte having the electrolyte solvent comprising a combination of a fluoroethylene carbonate compound and a linear ester compound, the inventive lithium secondary battery has improved safety and thus can operate at a high voltage without deterioration in the battery performance.

The present invention will hereinafter be described in further detail by examples. It is to be understood, however, that the present invention is not limited to or by the examples.

EXAMPLES

Preparation of Electrolyte and Measurement of Ion Conductivity

Examples 1 to 6 and Comparative Example 1 and 2

Monofluoroethylene carbonate (F1EC) and ethyl methyl carbonate were mixed with each other at volume ratios given in Table 2 below so as to prepare electrolyte solvents. Lithium hexafluorophosphate ($LiPF_6$) salts were dissolved in each of the prepared electrolyte solvents to a concentration of 0.8-1.2 M so as to prepare electrolytes. The electrolytes were measured for ion conductivity at ambient temperature using Metrohm 712 conductometer.

Examples 7 to 11

The preparation of electrolytes and the measurement of ion conductivity were performed in the same manner as in Examples 1-5 except that dimethyl carbonate (DMC) was used in place of ethyl methyl carbonate, at volume ratios given in Table 2.

Comparative Examples 1 and 2

The preparation of electrolytes and the measurement of ion conductivity were performed in the same manner as in Examples 1-7 except that ethylene carbonate and ethyl methyl carbonate or dimethyl carbonate were used at volume ratios given in Table 2 without using fluoroethylene carbonate.

Comparative Examples 3 and 4

The preparation of electrolytes and the measurement of ion conductivity were performed in the same manner as in Example 1 except that fluoroethylene carbonate, ethylene carbonate and ethyl methyl carbonate were used at volume ratios given in Table 2.

Comparative Example 5

The preparation of an electrolyte and the measurement of ion conductivity were performed in the same manner as in Example 1 except that fluoroethylene carbonate and propylene carbonate were used at volume ratios given in Table 2.

Fabrication of Batteries

In order to evaluate the performance and safety of batteries, lithium secondary batteries each having a structure as shown in FIG. 1 were fabricated using the electrolytes prepared in Examples 1-11 and Comparative Examples 1-5. Specifically, a negative electrode formed of a negative electrode current collector (Cu foil) coated with carbon as a negative active material, a positive electrode formed of a positive electrode current collector (Al foil) coated with $LiCoO_2$ as a positive active material, and a porous polyolefin separator, were wound several times around to make a cylindrical "jelly roll" structure. Then, after an insulator was placed on the upper and lower ends of the cylindrical jelly roll, the resulting cylindrical jelly roll was placed into a cylindrical battery can with a diameter of 18 mm and a height of 65 mm. Next, the prepared electrolyte was injected into the resulting battery can, to complete the fabricating of the battery.

Performance Evaluation

The discharge characteristic of the batteries was evaluated by the ratio of capacity upon discharge at a current of 1 C to capacity upon discharge at 0.2 C. The results are shown in Table 3 below.

Safety Evaluation

The batteries having a diameter of 18 mm and a height of 65 mm as fabricated above were charged to 4.2 V or charged to 4.35 V, and then placed in a hot air oven in which they were heated to 150° C. at a rate of 5° C./min and maintained at that temperature. While the batteries are maintained in the oven at that temperature, time to the thermal explosion of the batteries, representing the thermal safety of the batteries under these conditions, was measured. The results are shown in Table 3 and FIGS. 2 to 5.

TABLE 2

Composition of electrolyte solvent

| | LiPF$_6$ (Molar concentration, mol/l) | F1EC (vol %) | EC (vol %) | PC (vol %) | EMC (vol %) | DMC (vol %) |
|---|---|---|---|---|---|---|
| Example 1 | 0.8 | 25 | | | 75 | |
| Example 2 | 0.8 | 33 | | | 67 | |
| Example 3 | 0.8 | 40 | | | 60 | |
| Example 4 | 0.8 | 50 | | | 50 | |
| Example 5 | 0.8 | 60 | | | 40 | |
| Example 6 | 1.0 | 33 | | | 67 | |
| Example 7 | 0.8 | 25 | | | | 75 |
| Example 8 | 0.8 | 33 | | | | 67 |
| Example 9 | 0.8 | 40 | | | | 60 |
| Example 10 | 0.8 | 50 | | | | 50 |
| Example 11 | 0.8 | 60 | | | | 40 |
| Comp. Ex. 1 | 0.8 | | 33 | | 67 | |
| Comp. Ex. 2 | 0.8 | | 33 | | | 67 |
| Comp. Ex. 3 | 0.8 | 23 | 10 | | | 67 |
| Comp. Ex. 4 | 0.8 | 13 | 20 | | | 67 |
| Comp. Ex. 5 | 0.8 | 50 | | 50 | | |

TABLE 3

Test results on battery performance and safety

| | Ion conductivity at ambient temperature (mS/cm) | Discharge characteristic % (capacity at IC/capacity at 0.2 C) | Charged voltage | Time maintained at 150° C. (before rapid exothermic reaction) |
|---|---|---|---|---|
| Example 1 | 8.24 | 97.5 | 4.2 | Over 90 min |
| Example 2 | 8.40 | 94.6 | 4.2 | Over 90 min |
| Example 3 | 8.60 | 96.1 | 4.2 | Over 90 min |
| Example 4 | 7.95 | 96.2 | 4.2 | Over 90 min |
| Example 5 | 7.56 | 93.5 | 4.2 | Over 90 min |
| Example 6 | 8.88 | 97.5 | 4.2 | Over 90 min |
| Example 7 | 10.5 | 98.1 | 4.2 | Over 90 min |
| Example 8 | 10.6 | 98.2 | 4.2 | Over 90 min |
| Example 9 | 9.9 | 97.6 | 4.2 | Over 90 min |
| Example 10 | 9.5 | 97.5 | 4.2 | Over 90 min |
| Example 11 | 8.7 | 96.3 | 4.2 | Over 90 min |
| Comp. Ex. 1 | 8.9 | 96.5 | 4.2 | 30 min |
| Comp. Ex. 2 | 11.8 | 98.1 | 4.2 | 25 min |
| Comp. Ex. 3 | 8.41 | 97.1 | 4.2 | 60 min |
| Comp. Ex. 4 | 8.56 | 97.0 | 4.2 | 30 min |
| Comp. Ex. 5 | 5.8 | —* | 4.2 | —* |

—* Not measurable since electrode was not impregnated due to high viscosity of the electrolyte.

As evident from Table 3 above, the batteries of Examples, which contain fluoroethylene carbonate in combination with linear ester solvent as the electrolyte solvent, exhibited excellent ion conductivity and safety (as measured by the amount of time the battery could be maintained at high temperature after charging at 4.2V).

However, the batteries of Comparative Examples 1 and 2, which contain no fluoroethylene carbonate, showed a significantly lower safety measure (i.e., less time maintained at temperature after charging, and before rapid exothermic reaction) than that of the batteries fabricated in Examples 1-11. Furthermore, the batteries of Comparative Examples 3 and 4, each of which contains a relatively small amount of fluoroethylene carbonate and which contains a cyclic carbonate, showed inferior safety when compared to the batteries of Examples 1-11. Moreover, in the battery of Comparative Example 5, which contains fluoroethylene carbonate and propylene carbonate (cyclic carbonate) without using the linear ester solvent, the discharge characteristic and safety of the battery could not be measured since the electrode was not impregnated with the electrolyte due to a high viscosity of the electrolyte. As seen in the data in FIGS. 2 and 4, the thermal safety of the battery fabricated by using the electrolyte prepared in Comparative Example 1 is, under the foregoing conditions, damaged at 60 minutes (charged at 4.2 V, in FIGS. 2) and 38 minutes (charged at 4.35 V, in FIG. 4) respectively, which corresponds to the peaks seen in the temperature trace at these times.

Figure 3:
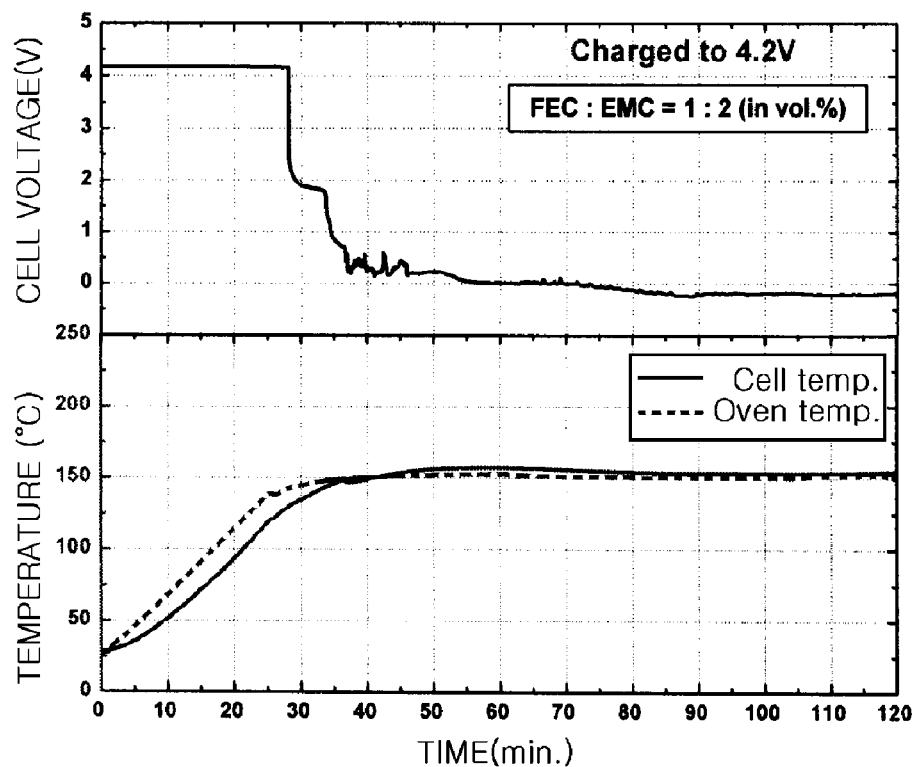
Figure 5:
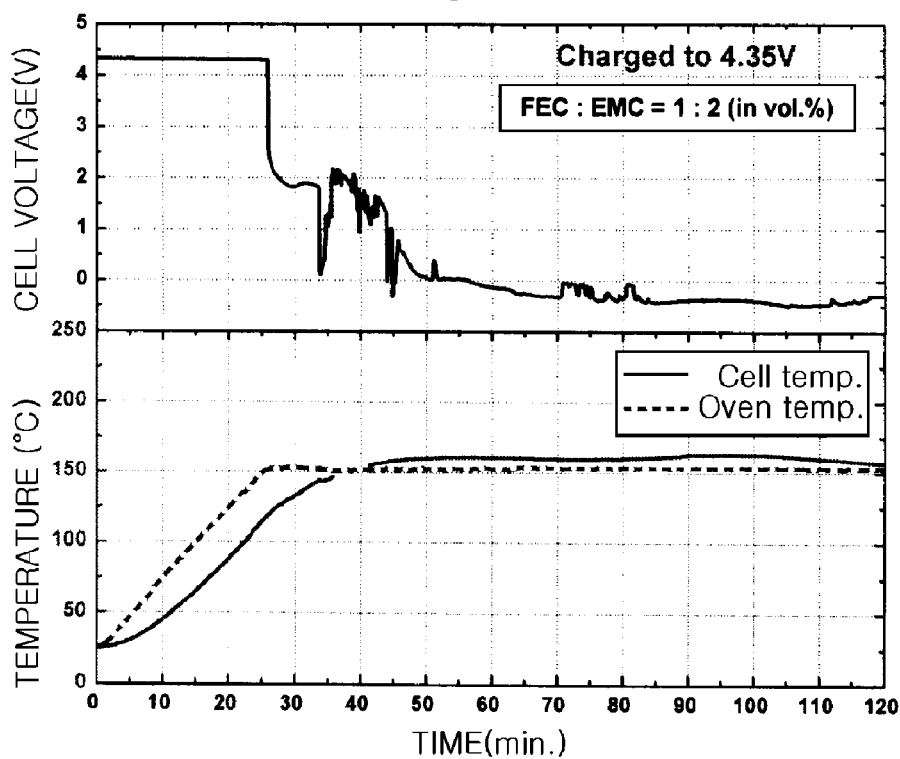

However, as seen in FIGS. 3 and 5, wherein the battery fabricated by using the electrolyte prepared in Example 2 is used, no peak is seen in the temperature traces that correspond to thermal safety, hence the battery is thermally safe when charged at both 4.2 V and at 4.35V.

Figure 4:
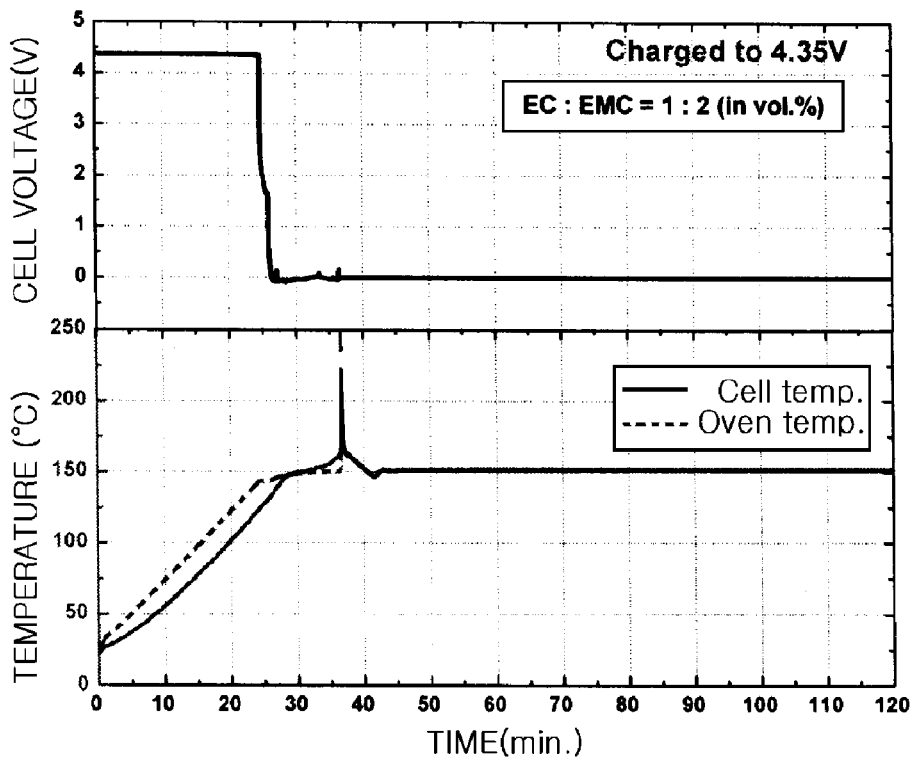
FIGS. 4 and 5 are graphic diagrams showing the results of hot-box tests in a charged state of 4.35 V on batteries fabricated by using the electrolytes prepared in Comparative Example 1 and in Example 2, respectively.

That is, FIGS. 4 and 5 show the results of safety tests on the batteries charged to 4.35 V. As shown in FIGS. 4 and 5, the battery fabricated by using the electrolyte prepared in Comparative Example 1 could not be maintained in the oven at 150° C. even for 38 minutes (FIG. 4), whereas the battery fabricated by using the electrolyte prepared in Example 2 maintained its safety as shown by its thermal stability (i.e., no rapid exothermic reaction) in the oven at 150° C. over 2 hours.

Cycle Characteristics

Figure 6:
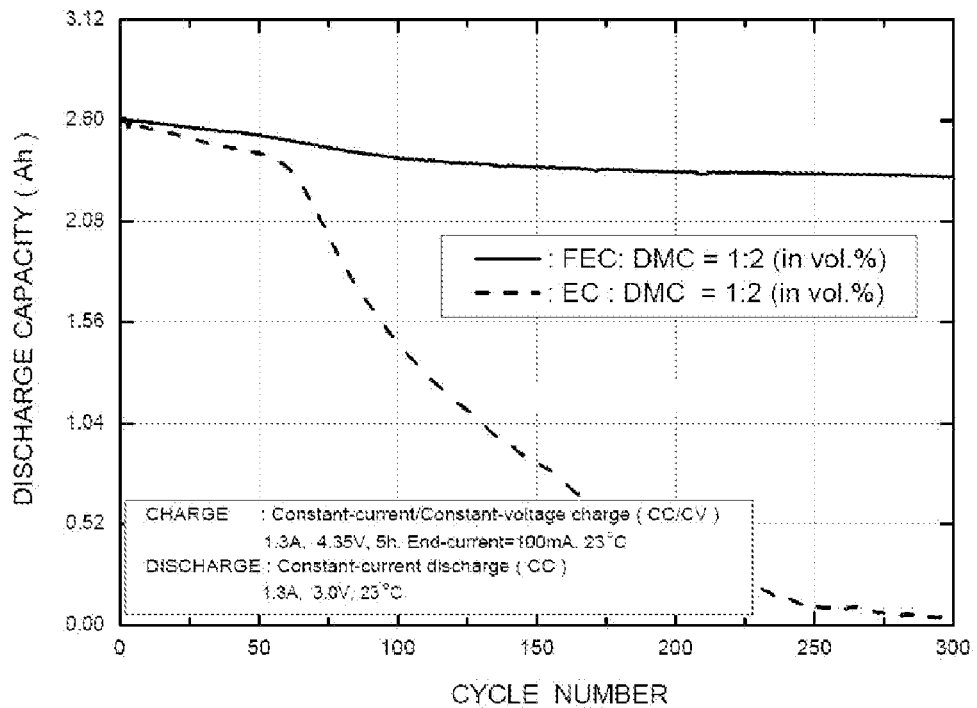
FIG. 6 is a graph showing cycle characteristics of each of the lithium secondary batteries designed to operate at a high charging voltage of 4.35V, which are fabricated by using the electrolytes prepared in Comparative Example 2 (EC: DMC=1:2 in vol. %) and in Example 8 (FEC:DMC=1:2 in vol. %), respectively, after 300 cycles of charge/discharge between charging voltage of 4.35V and discharging voltage of 3.0V.

FIG. 6 is a graph showing cycle characteristics of each of the lithium secondary batteries fabricated by using the electrolytes prepared in Comparative Example 2 (EC:DMC=1:2 in vol. %) and in Example 8 (F1EC:DMC=1:2 in vol. %), respectively, which are designed to operate at a high charging voltage of 4.35V.

Cycle characteristics are measured by charging and discharging the batteries between charging voltage of 4.35V and discharging voltage of 3.0V.

When the battery, fabricated by using the electrolyte of the Comparative Example 2 comprising ethylene carbonate (EC) and dimethyl carbonate (DMC) in a volume ratio of 1:2, is charged to 4.35V and discharged repeatedly, the capacity of the battery rapidly drops after 50 cycles of charge/discharge.

However, when the battery, fabricated by using the electrolyte of the Example 8 comprising fluoroethylene carbonate (F1EC) and dimethyl carbonate (DMC) in a volume ratio of 1:2 is used, the capacity of the battery is maintained after 300 cycles of charge/discharge.

INDUSTRIAL APPLICABILITY

As can be seen from the foregoing, according to the present invention provides, fluoroethylene carbonate in combination with linear ester is used as an electrolyte solvent for batteries. This can improve the battery safety while preventing deterioration in the battery performance.

The invention claimed is:

1. An electrolyte for lithium secondary batteries comprising an electrolyte solvent and a lithium salt,
wherein the electrolyte solvent comprises a combination of a fluoroethylene carbonate compound and a linear ester compound, and wherein a lithium secondary battery formed from the electrolyte operates without rapid exothermic reaction when charged at a charging voltage up to 4.35V.

2. The electrolyte of claim 1, wherein the fluoroethylene carbonate compound is contained at the amount of 20-60% by volume, based on the total volume of the electrolyte solvent, and the linear ester compound is contained at the amount of 40-80% by volume, based on the total volume of the electrolyte solvent.

3. The electrolyte of claim 1, wherein the fluoroethylene carbonate compound is at least one selected from the group consisting of monofluoroethylene carbonate and difluoroethylene carbonate.

4. The electrolyte of claim 1, wherein the linear ester compound is at least one selected from the group consisting of ethyl methyl carbonate, dimethyl carbonate, diethyl carbonate, ethyl acetate and methyl propionate.

5. The electrolyte of claim 1, which has an ion conductivity of 7 mS/cm or more.

6. The electrolyte of claim 1, wherein the lithium secondary battery has a full-charging voltage of 4.2V to 4.35V.

7. A lithium secondary battery comprising a positive electrode, a negative electrode and an electrolyte,
wherein the electrolyte comprises an electrolyte solvent and a lithium salt and the electrolyte solvent comprises a combination of a fluoroethylene carbonate compound and a linear ester compound, and
wherein the lithium secondary battery operates without rapid exothermic reaction when charged at a charging voltage up to 4.35V.

8. The lithium secondary battery of claim 7, wherein the fluoroethylene carbonate compound is contained at the amount of 20-60% by volume, based on the total volume of the electrolyte solvent, and the linear ester compound is contained at the amount of 40-80% by volume, based on the total volume of the electrolyte solvent.

9. The lithium secondary battery of claim 7, wherein the fluoroethylene carbonate compound is at least one selected from the group consisting of monofluoroethylene carbonate and difluoroethylene carbonate.

10. The lithium secondary battery of claim 7, wherein the linear ester compound is at least one selected from the group consisting of ethyl methyl carbonate, dimethyl carbonate, diethyl carbonate, ethyl acetate and methyl propionate.

11. The lithium secondary battery of claim 7, wherein the electrolyte has an ion conductivity of 7 mS/cm or more.

12. The lithium secondary battery of claim 7, which has full-charging voltage of 4.2V to 4.35V.

13. An electrolyte for a lithium secondary battery having full-charging voltage of up to 4.35V, which comprises an electrolyte solvent and a lithium salt,
wherein the electrolyte solvent comprises a combination of a fluoroethylene carbonate compound and a linear ester compound,
the fluoroethylene carbonate compound is contained at the amount of 20-60% by volume, based on the total volume of the electrolyte solvent, and the linear ester compound is contained at the amount of 40-80% by volume, based on the total volume of the electrolyte solvent, and
the electrolyte has an ion conductivity of 7 mS/cm or more.

* * * * *